United States Patent [19] [11] 4,194,210
Krause [45] Mar. 18, 1980

[54] MULTI-NOZZLE INK JET PRINT HEAD APPARATUS

[75] Inventor: Konrad A. Krause, Mountain View, Calif.

[73] Assignee: International Business Machines Corporation, Armonk, N.Y.

[21] Appl. No.: 871,299

[22] Filed: Jan. 23, 1978

Related U.S. Application Data

[63] Continuation of Ser. No. 671,920, Mar. 29, 1976, abandoned.

[51] Int. Cl.$^{2}$ .................... G01D 15/18
[52] U.S. Cl. .................... 346/75
[58] Field of Search .................... 346/75

[56] References Cited

U.S. PATENT DOCUMENTS

| | | | |
|---|---|---|---|
| 3,560,641 | 2/1971 | Taylor | 346/75 X |
| 3,955,203 | 5/1976 | Chocholaty | 346/75 |
| 4,010,477 | 3/1977 | Frey | 346/75 |
| 4,014,029 | 12/1977 | Lane | 346/75 X |

OTHER PUBLICATIONS

Gamblin et al.; Orthogonalization of Electrostatic Printing; IBM Tech. Disc. Bulletin, vol. 11, No. 10, Mar. 1969, pp. 1292-1293.
Fowler, R. L.; Ink Jet Copier Nozzle Array; IBM Tech. Disc. Bulletin; vol. 16, No. 4, Sep. 1973, pp. 1251-1253.

*Primary Examiner*—Joseph W. Hartary
*Attorney, Agent, or Firm*—Otto Schmid, Jr.

[57] ABSTRACT

A multi-nozzle electrostatic ink jet head for producing streams of ink drops for selective deposition on a record medium, arranged orthogonal to the direction of relative head-to-medium motion, having plural rows of nozzles and corresponding charge electrodes arranged on the diagonal with respect to the relative motion, and having common deflection electrodes for all streams.

8 Claims, 9 Drawing Figures

MULTI-NOZZLE INK JET PRINT HEAD APPARATUS

This is a continuation of application Ser. No. 671,920 filed Mar. 3, 1976, now abandoned.

BACKGROUND OF THE INVENTION

The need for high-quality, high-speed computer printers and other types of output printers with changeable formats has been evidenced in recent years. Developments have proceeded with respect to ink jet technology to answer this need. Most developments in the field of ink jet have related to pressure deflected systems such as taught by Sweet U.S. Pat. No. 3,596,275, wherein a single stream of ink droplets are selectively charged and passed through a uniform deflection field to impact various locations on a recording medium in accordance with the charge of each droplet. Thus, by applying suitable charging signals to the droplets, a visible human-readable printed record may be formed on the recording surface. This type of system requires very precise control over the charge placed on each droplet due to various factors such as the tendancy of similarly charged droplets closely adjacent to one another to repel each other and therefore impact the recording medium at unintended locations. The circuitry required to accomplish this precise control appears to be relatively expensive, especially when duplicated for each jet of a multi-jet printer, which is required to attain truly high speeds.

Another type of ink jet printing has been developed which offers the potential of attaining high-speed, high-quality variable printing without requiring the expensive precision charging control electronic circuitry. This type of printing may be called the binary pressurized type and is shown in Sweet et al, U.S. Pat. No. 3,373,437. This type of system generates a plurality of jets in one or more rows, selectively charging drops with a single charge signal for deflection by a constant field to an ink drop gutter. The uncharged drops continue along the original jet stream path to impact a recording medium. The precision control over charging is not required inasmuch as charged drops impact the gutter and not the recording medium. In the absence of selective deflection, the major disadvantage of this type of ink jet printing has been that one nozzle orifice is required for each printing position across the entire dimension of the path to be printed in a single pass.

High quality printing requires additionally, however, that adjacent spots on the recording medium either adjoin or slightly overlap one another to form characters or images. Lines comprising a series of adjacent spots must appear to have a relatively smooth edge.

However, multi-orifice ink jet drop generation requires that the nozzles have sufficient structures to withstand the pressure of the pressurized ink. This dictates a minimum separation of the orifices. Further, each stream is selectively charged by a separate charge electrode, imposing an additional minimum orifice separation requirement in order to accommodate the charge electrodes.

Other technologies having similar spacing problems have illustrated various ways of arranging the print elements. For example, Murray, U.S. Pat. No. 2,556,550 illustrates that the print elements may be arranged in a long line extending diagonally entirely across a page, and illustrates that the print elements may be arranged in two parallel rows orthogonal to the paper-to-print-element motion and staggered laterally. Taylor, U.S. Pat. No. Re. 28,219, employs laterally staggered rows for binary multi-orifice ink jet. Each row of jet orifices includes charging electrodes, deflection plates and gutters for that row, resulting in a complex arrangement requiring precision alignment between rows. Any attempt to employ the diagonal line arrangement may simplify the ink jet head structure, but would result in the requirement of data buffer storage for an entire page of data and complex electronics.

Hence, an object of the present invention is to provide an ink jet head arrangement giving sufficiently close spot deposition with less complexity and less storage requirements.

SUMMARY OF THE INVENTION

Briefly, an ink jet head is provided for producing a plurality of parallel streams of uniformly sized ink drops including a plurality of rows of nozzles, each row arranged along a line diagonally oriented with respect to the direction of relative movement between a recording medium and the head, and a plurality of rows of charge electrodes arranged in correspondence with the nozzles for selectively charging the ink drops. The head additionally includes common deflection means for all the rows arranged on opposite sides of the streams for deflecting the selectively charged drops from normal paths to deflected paths, and gutter means arranged to catch the drops in one of the paths to prevent their impacting the recording medium.

A feature of the present invention is that the ink jet head may include a common manifold for supplying pressurized ink to the nozzles.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Multi-orifice, binary, pressurized ink jet systems offer the potential of avoiding the extensive and costly charging control or deflection control mechanisms of pressurized deflected ink jet systems. The major difficulty of the binary systems is that various structural considerations, such as nozzle strength and the requirement of separately charging drops from each ink jet stream, require that the adjacent orifices be constructed a distance from one another greater than the distance that is required to attain spots on a recording medium which adjoin or slighly overlap one another. It is this problem that is solved by the structure of the present invention, without the undue complexity or large memory capacity and complicated electronics required by other approaches.

Figure 1:
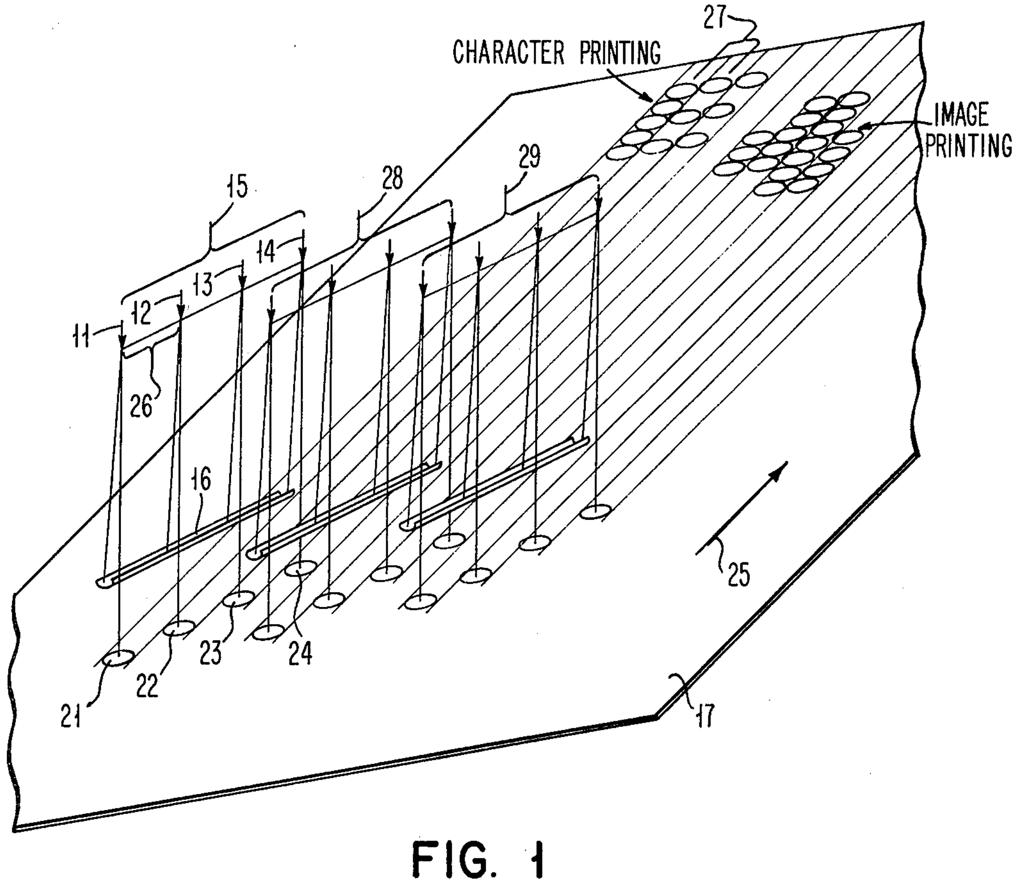
FIG. 1 is a schematic showing of multi-nozzle ink jet drop streams and drop placement of an ink jet head arrangement in accordance with the present invention.

Referring to FIG. 1, a plurality of ink jets 11–14 are arranged in a single row 15 so that drops may be selectively deflected to a gutter 16 or impact a recording medium 17 at drop impact locations 21–24. The row 15 is arranged at an acute angle with respect to the direction 25 of relative motion between the ink jet head and the recording medium 17. As the result, row 15 can be said to be on a diagonal with respect to the direction of motion 25. Each ink jet stream 11–14 in row 15 may thus be separated by a relatively large center-to-center distance 26 of, for example, 12 mils, and yet attain a relatively close center-to-center distance 27 between resultant spots in a direction orthogonal to the direction of motion 25 of, for example, 4 mils. Similar rows 28 and 29 may be arranged having the same angle as row 15 with respect to the direction of motion 25. Additional rows may be used to attain any desired width of the ink jet head assembly, the width being measured orthogonal with respect to the direction of motion 25.

Figure 2:
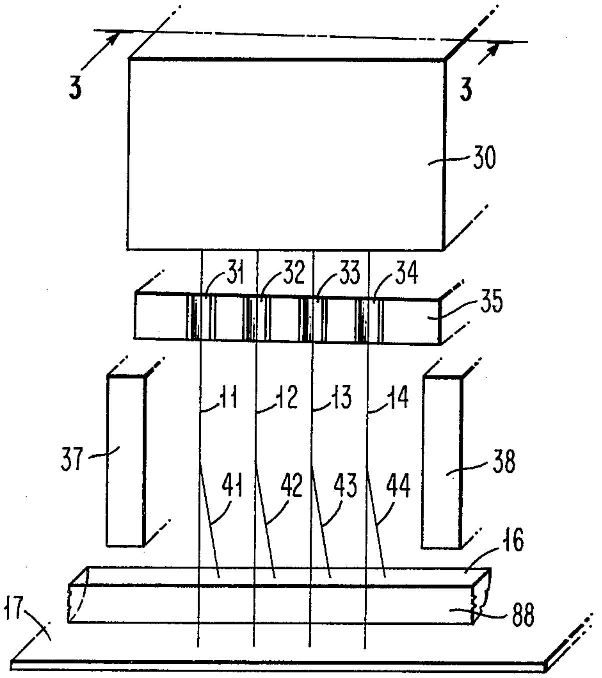
FIG. 2 is a perspective view of an ink jet head arrangement constructed in accordance with the present invention.

An ink jet head assembly for producing and deflecting the ink jet streams of FIG. 1 is illustrated in FIG. 2. Specifically, the ink jet streams 11–14 are projected from drop generator 30 as fluid stream filaments, perturbated by a modulating signal. The modulation signal is such that each filament breaks into a corresponding stream of uniform drops. Charge electrodes 31–34 in a charge plate 35 are positioned along each of the streams at the point where each stream breaks into drops. An electrical signal at the charge electrode at the moment of drop breakoff causes the drop to assume a charge induces by the electrical signal at the charge electrode.

Deflection plates 37 and 38 are of substantially different voltages such that an electric field is established therebetween. One deflection plate may be grounded and the other may have a substantial voltage, or, the deflection plates may be of opposite polarity. Drops which break off at the filament at the time there is no signal at the corresponding charge electrode, are not affected by the deflection field. They thus continue along the original path and impact record medium 17. Those drops which have received a charge are deflected by the deflection field into paths 41–44 into the gutter 16. The gutter 16 may be made of a screen or porous material on the surface impacted by the drops and may have a porous or hollow interior into which the deflected drops are drawn, for example, by a vacuum. The deflected drops are thus not used for printing, but may be recirculated and employed again.

The deflection plates 37 and 38 are arranged along essentially parallel lines which are obliquely skewed with respect to each of the rows of nozzles, but are parallel to lines drawn through corresponding nozzles in each row. In FIG. 2, the deflection plates are perpendicular to the direction of motion of the record medium.

Figure 3:
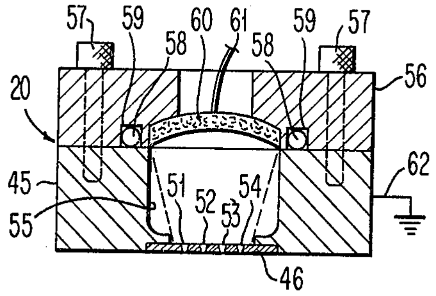
FIG. 3 is a sectional view of the drop generator structure of FIG. 2.

FIG. 3 is a sectional view of the drop generator assembly of FIG. 2 taken through the nozzle orifices. It includes a manifold plate 45 on which is attached an orifice plate 46 located on the front thereof, the orifice plate including orifices 51–54 for forming the jet streams 11–14. The manifold plate 45 includes an interior cavity 55 to which a source of pressurized ink is connected.

A backing plate 56 is assembled to the cavity plate 45 by means of cap screws 56, and a fluid seal is formed by manes of sealing ring 58 located in slot 59. The backing plate may be made of a dielectric material or may be insulated electrically from the cavity plate by a semi-elastic adhesive. In order to form uniformly sized ink drops from the ink filaments created by ejection of the pressurized ink from the orifices, a drop generating transducer is provided. This transducer may comprise a piezoelectric ceramic bar 60. The piezoelectric transducer is mounted on backing plate 56, and may be of a concave shape so as to focus a fluid pressure wave generated thereby on the orifice plate 46. The transducer may be connected by means of wire 61 to a source of a drop generator signal. The source provides an A.C. electrical signal of a proper frequency to operate the transducer 60 to cause the streams to break into streams of uniform drops of the desired size. For example, the source may comprise an oscillator operating in the 100 KHz range. Cavity plate 45 is electrically connected to ground 62 so that the electrically conductive ink in manifold 55 grounds the site of the piezoelectric crystal 60 which is in contact with the ink. This allows the electrical signal appearing on line 61 to operate the piezoelectric crystal.

Figure 4:
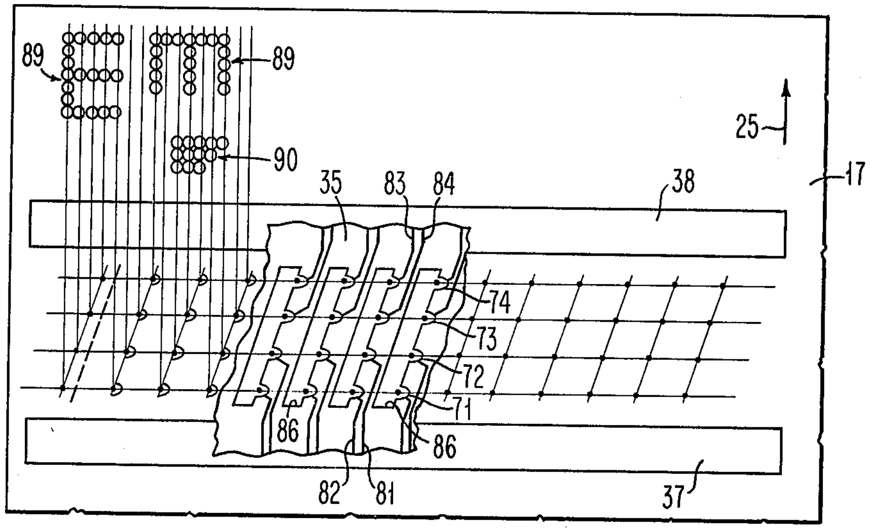
FIG. 4 is a top view of the partially cut-away charge electrode struction, the deflection electrodes and the drop placement of the assembly of FIG. 2.

Referring to FIG. 4, a portion of the charge electrode 35 is illustrated in a top view essentially orthogonal to the print media 17. Also illustrated are the deflection electrodes 37 and 38 and the drop placement of the assembly of FIG. 2. The charge plate 35 includes a plurality of "U" shaped charge electrodes, for example electrodes 71–74. The charge plate 35 is formed of a dielectric material and the charge electrodes are each formed of an electrically conductive material which may, for example, be plated on the interior of the notches 71–74. Each charge electrode is connected by means of an electrically conductive land 81–84 to charge signal circuitry. All of the other sets of charge electrodes are similarly arranged.

In addition to the notches, charge plate 35 includes an open area 86 which interconnects each of the charge electrode notches for each row. This open area allows the charge plate to be moved to the left during startup and stopping of the ink jets to avoid flooding of the charge electrodes. During normal running, the charge plate is moved to the right into the position shown in FIGS. 2 and 4 for proper charging of the ink drops.

The drops that are not charged are not deflected by the deflection field between deflection plates 37 and 38 and contginue on a normal path to impact the recording medium 17 in the pattern illustrated.

Figure 5:
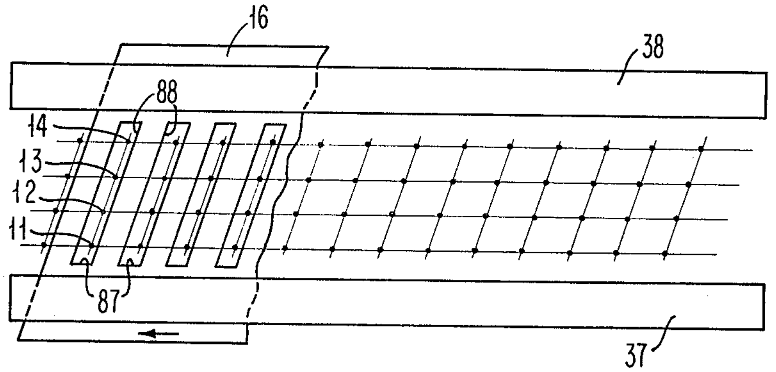
FIG. 5 is a top view of the deflection electrodes and gutter structure of the arrangement of FIG. 2.

Referring additionally to FIG. 5, the deflection plates 37 and 38 and the guttering or sump structure 16 are shown as viewed from the top and perpendicular to the recording medium. The ink sump structure 16 is arranged with a plurality of elongate openings 87 through which undeflected ink jet drops may pass to impact the recording medium. Side 88 of each of the openings is arranged to be parallel to the corresponding row of ink jets and in close proximity thereto so that a slight deflection of the drops will cause them to impact the sump assembly. By impacting the sump assembly, such deflected drops are absorbed thereby and drawn off by a vacuum. Thus, referring to FIGS. 2 and 5, uncharged drops and ink jet streams 11–14 continue along the initial path to impact print medium 17. Those drops which are selectively charged, proceed on paths 41–44 as deflected by the deflection field established by plates 37 and 38 to impact the ink sump structure 16. Referring to FIG. 4, selective charging of the droplets allows the uncharged droplets to impact the print medium to form characters 89 or images 90.

The present invention therefore allows adjacent ink jet streams to be spaced an appropriate amount required by the orifice and charging structures and the use of common deflection means to deflect selectively charged drops, and a sump for preventing selected drops from impacting recording medium, to ultimately produce the selected printing of drops in adjacent paths substantially closer to one another than the distance between the originating ink jet streams.

Referring again to FIG. 5, the ink sump structure 16 may be arranged to be moved to the left during startup and stopping of the ink jet streams in conjunction with the movement to the left of the charge electrode structure 35 in FIG. 4. During startup and shutdown, the ink streams will not be deflected, but rather will continue on a straight path intersecting with the ink sump structure when moved to the left.

An alternative arrangement of the charge electrode structure of FIG. 4, the charge electrode plate 35 may comprise two plates separated down the middle, as between charge electrodes 72 and 73, to allow the electrode structure to be removed. This would be advantageous, should flooding be an extreme problem during startup or shutdown such that the large opening 86 would be insufficient to handle the volume of ink.

Figure 6:
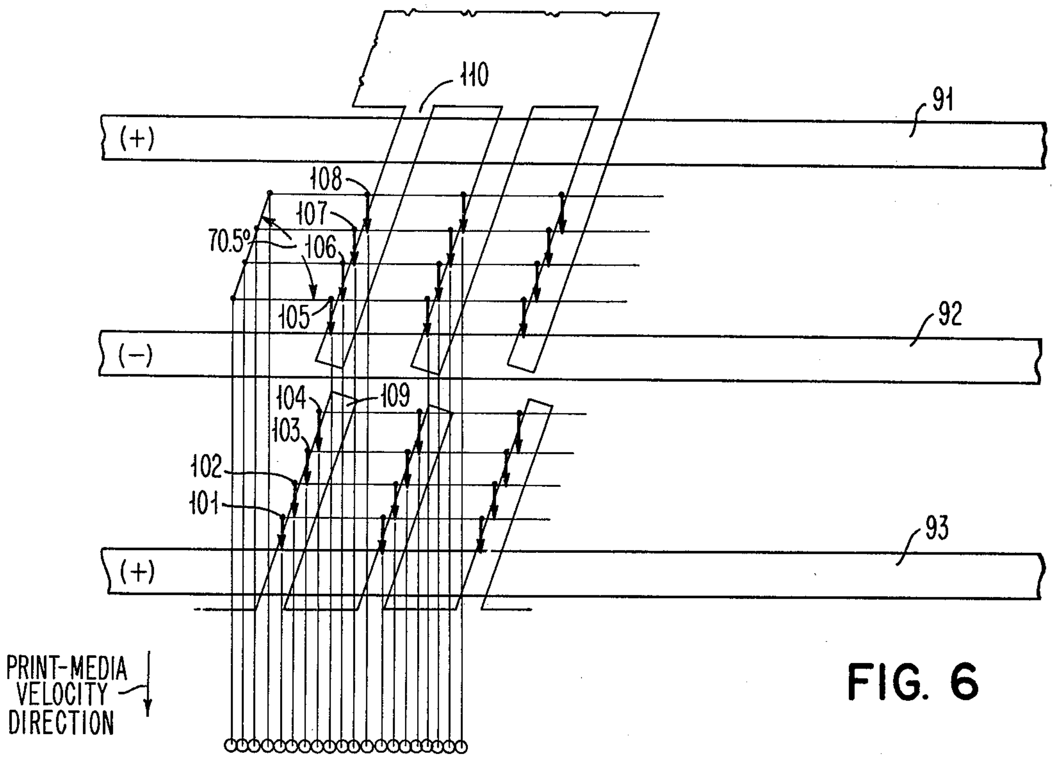
FIG. 6 comprises a diagrammatic illustration of an alternative embodiment of the invention with three deflection electrodes.

FIG. 6 illustrates diagrammatically an alternative arrangement of the invention complying three deflection plates 91, 92 and 93. Each set of ink jets is arranged in a row as before, except that rows producing alternate sets of ink drops are located on opposite sides of deflection plate 92. Thus, the row comprising ink jets 101–104 lies on the opposite side of deflection plate 92 from the row of ink jets 105–108. Deflection plates 91 and 93 are of the same polarity and voltage and deflection plate 92 is of the opposite polarity. Droplets and ink jet rows 101–104 to be deflected are charged with negative charge signals so that the selectively charged drops are deflected away from deflection plate 92 and towards deflection plate 93 and thereby impact sump 109. Ink drops fron jets 105–108 to be deflected are charged positively, however, to thereby cause the drops to be repelled from deflection plate 91 and attracted to deflection plate 92 to impact ink sump 110. By arranging the charging polarities and the sump structure in this manner, the charge electrodes (not shown) and the sump structure 109 and 110 may be moved to the left for startup and then returned to the normal position for normal operation. The use of three deflection plates complicates the system slightly, but allows additional spacing between the rows of jets, for example 0.032 inches while retaining the 0.004 inch drop spacing.

Figure 7:
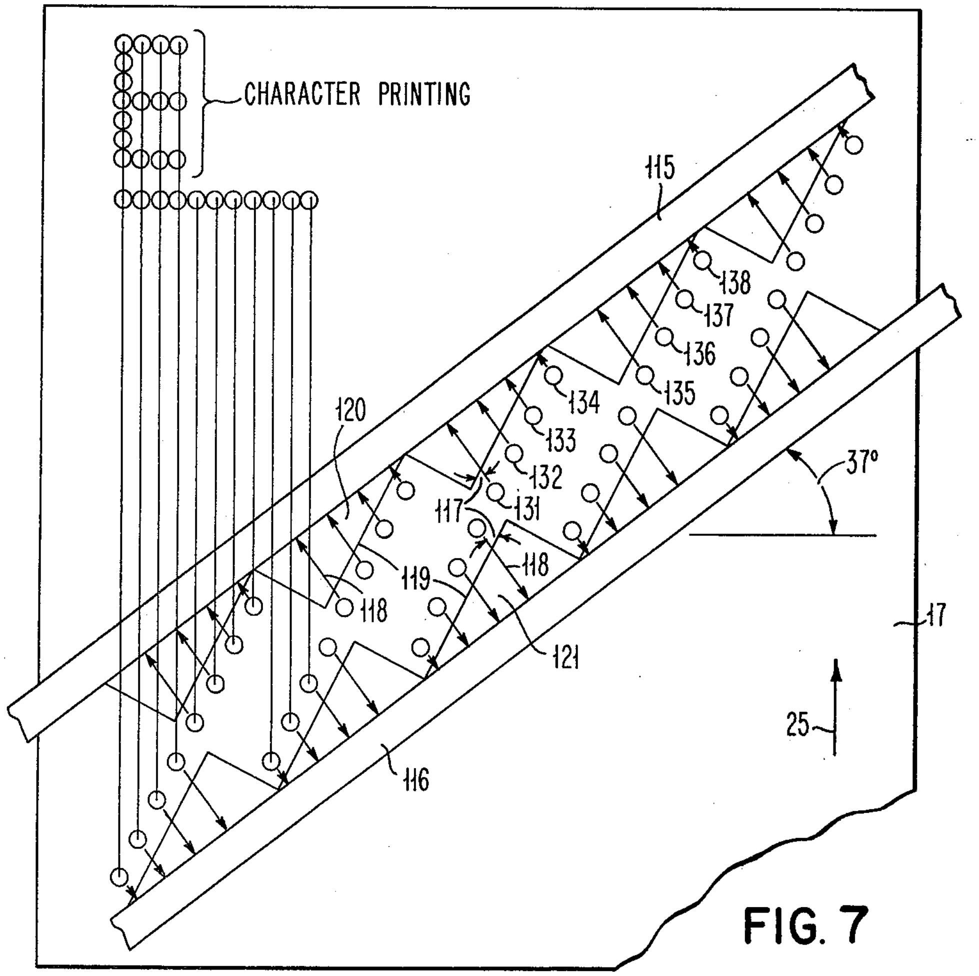
FIG. 7 comprises a diagrammatic illustration of a second alternative embodiment of the invention employing deflection electrodes diagonal to the relative head-to-record medium motion.

FIG. 7 illustrates another alternative embodiment wherein the deflection plates 115 and 116 are canted slightly with respect to the relative head-to-record medium motion represented by arrow 25. A major advantage of canting the deflection plates is that the angle 117 between the direction of deflection 118 of charge drops with respect to the leading edge 119 of the sump structure 120 or 121 approaches a right angle so that the deflection voltages and the charge signals need not be as great. In the arrangement shown, the rows comprising jets 131–134 may extend along the same line as the row comprising jets 135—135, but the drops of row 131–134 to be deflected are charged oppositely to those of row 135–138.

Figure 8:
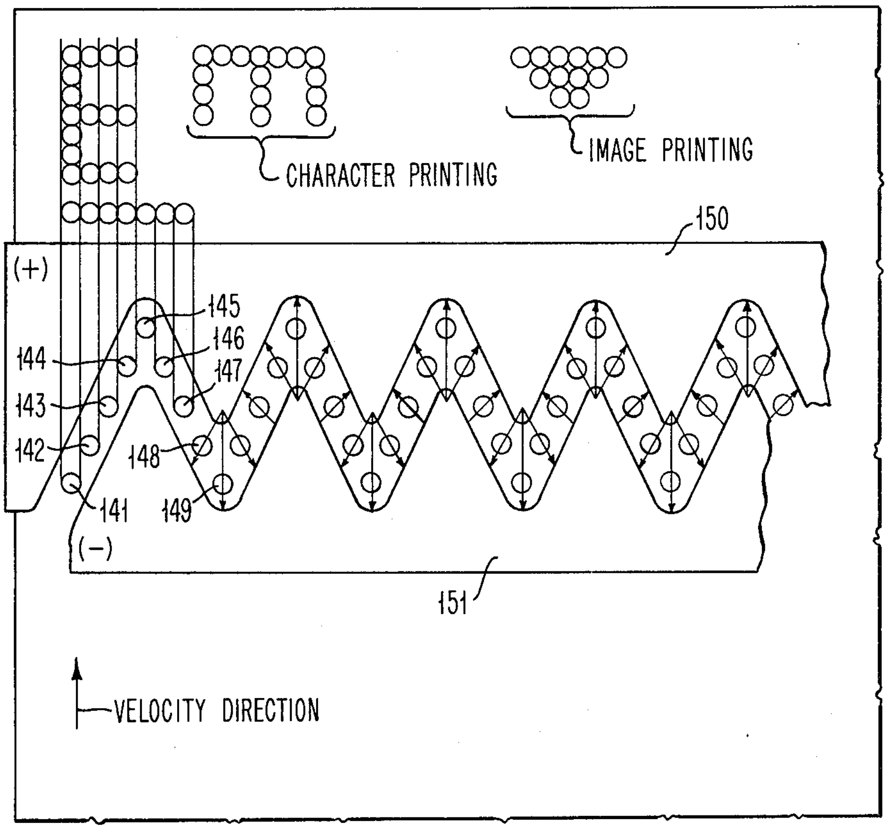
FIG. 8 comprises a diagrammatic illustration of a third alternative embodiment of the invention employing a zig-zag structure.
Figure 9:
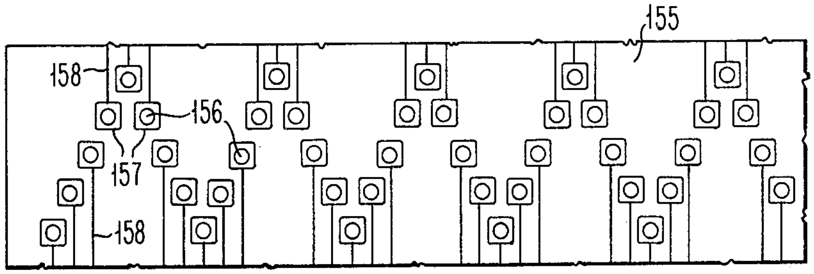
FIG. 9 is a top view of the charge electrode structure of the embodiment of FIG. 8.

FIGS. 8 and 9 illustrate a still alternative arrangement wherein adjacent rows of ink jets are arranged along intersecting, rather than parallel, lines. Thus, the row of ink jets 141–145 may be said to intersect with the row of ink jets 145–149. With such an arrangement, the common deflection plates and common sumps may comprise the same structure 150 and 151 and may be arranged in zigzag fashion to come into close proximity with the ink jet drop paths. In order to provide deflection to the deflection plate having the greatest adjacent area as a sump for absorption of the ink drop, the drops to be charged from the ink jets of one pinnacle of the zigzag are charged oppositely to those from the jets at the other end of the same row. Thus, assuming that deflection plate, sump 150 has a positive voltage, and deflection plate, sump 151 has a negative voltage, drops to be charged in ink jet streams 143–147 are charged negatively and the drops to be charged in ink jet streams 141, 142, 148 and 149 are charged positively. The charged droplets from streams 143–147 thus impact the surface of deflection plate, sump 150 and the charged drops from streams 141, 142, 148 and 149 impact the surface of deflection plate, sump 151. The charge electrodes of FIG. 9 are arranged in a similar zigzag fashion. The charge plate 155 comprises a dielectric having a plurality of holes 156 around and through which may be plated an electrically conductive material 157. Each resultant electrode is then connected by means of electrically conductive lands 158 to the appropriate charging circuitry.

While the invention has been particularly shown and described with reference to preferred embodiments thereof, it will be understood by those skilled in the art that various changes in the form and details may be made therein without departing from the spirit and scope of the invention.

What is claimed is:

1. An ink jet head for producing a plurality of parallel streams of uniformly sized ink drops for selective deposition on a recording medium during relative movement between said medium and said head comprising:

- a plurality of rows of nozzles, each row arranged diagonally with respect to the direction of said relative movement and in a plane parallel to said recording medium;
- manifold means for said nozzles having an input for supplying pressurized ink from a source to said nozzles to project a stream of ink from each of said nozzles along parallel paths;
- perturbation means for perturbating said ink to cause said streams of ink to break into corresponding streams of uniformly sized drops along said parallel paths;

a plurality of rows of charge electrodes arranged correspondingly with said nozzles and disposed at the point of breakoff of said drops for selectively charging said drops;

common deflection means comprising two deflection electrodes arranged respectively on opposite sides of all said plurality of streams of drops to establish a single electrostatic deflection field for deflecting said selectively charged drops from said parallel paths to deflected paths; and gutter means arranged to catch said drops in one of said sets of paths to prevent their impacting said recording medium, whereby said drops in the other of said sets of paths impact said recording medium to produce a plurality of spaced marking on said medium.

2. The ink jet head of claim 1 wherein:

said two deflection electrodes of said common deflection means are additionally arranged along essentially parallel lines, which lines are obliquely skewed with respect to said rows of nozzles.

3. The ink jet head of claim 2:

wherein said rows of nozzles additionally are parallel and contain the same number of nozzles;

wherein said rows of charge electrodes additionally are parallel and contain the same number of electrodes; and wherein said two deflection electrodes of said common deflection means are arranged along said essentially parallel lines which lines are additionally parallel to a line through corresponding nozzles in each said row.

4. The ink jet head of claim 3:

wherein said nozzles in each said row comprise at lease four equally spaced nozzles;

wherein said charge electrodes in each said row comprise at least four equally spaced charge electrodes; and wherein said gutter means is arranged to have an edge parallel to each of said rows between said parallel paths and said deflected paths.

5. The ink jet head of claim 1:

wherein said rows of nozzles additionally are arranged along intersecting lines wherein alternate ones of said rows are parallel;

wherein said rows of charge electrodes additionally are arranged along intersecting lines wherein alternate ones of said rows are parallel; and wherein said gutter means is arranged to have at least one edge parallel to each of said rows and placed between said parallel paths and said deflected paths.

6. An ink jet head for producing a plurality of parallel streams of uniformly sized ink drops for selective deposition on a recording medium during relative movement between said medium and said head comprising:

a plurality of rows of nozzles, each row arranged diagonally with respect to the direction of said relative movement and in a plane parallel to said recording medium;

manifold means for said nozzles having an input for supplying pressurized ink from a source to said nozzles to project a stream of ink from each of said nozzles along parallel paths;

perturbation means for perturbating said ink to cause said streams of ink to break into corresponding streams of uniformly sized drops along said parallel paths;

a plurality of rows of charge electrodes arranged correspondingly with said nozzles and disposed at the point of breakoff of said drops for selectively charging said drops;

common deflection means comprising three deflection electrodes including a center electrode of a first polarity and two outer electrodes of a second polarity arranged respectively on opposite sides of said center electrode and on opposite sides of all said streams of drops to establish two electrostatic deflection fields each of which deflects said selectively charged crops from a plurality of said rows from said parallel paths to deflected paths; and gutter means arranged to catch said drops in one of said sets of paths to prevent their impacting said recording medium, whereby said drops in the other of said sets of paths impact said recording medium.

7. An ink jet head for producing a plurality of parallel streams of uniformly sized ink drops for selective deposition on a recording medium during relative movement between said medium and said head, comprising:

a plurality of rows of nozzles, each row arranged diagonally with respect to the direction of said relative movement and in a plane parallel to said recording medium;

a common manifold for said nozzles having an input for supplying pressurized ink from a source to said nozzles to project a parallel stream of ink from each of said nozzles;

a common perturbation means for perturbating said ink to cause said streams of ink to break into corresponding parallel streams of uniformly sized drops;

a plurality of rows of charge electrodes arranged correspondingly with said nozzles and disposed at the point of breakoff of said drops for selectively charging said drops electrostatically;

common deflection means comprising two parallel deflection plates on either side of said plurality of parallel streams of drops for deflecting said selectively charged drops, whereby uncharged drops are undeflected and impact said recording medium; and gutter means arranged to catch said deflected drops to prevent their impacting said recording medium.

8. The ink jet head of claim 7 wherein:

said common perturbation means additionally comprises a piezoelectric transducer of concave shape within said common manifold to focus a pressure wave perturbation of said ink on said plurality of rows of nozzles.

* * * * *